UNITED STATES PATENT OFFICE.

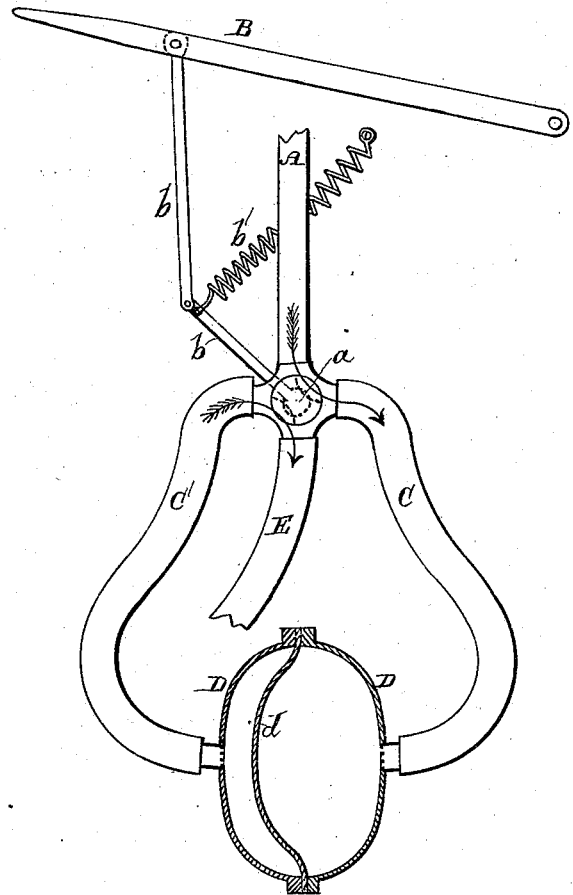

WILLIAM M. SACK, OF OAKLAND, CALIFORNIA.

WATER-CLOSET VALVE.

SPECIFICATION forming part of Letters Patent No. 235,573, dated December 14, 1880.

Application filed April 17, 1880. (No model.)

*To all whom it may concern:*

Be it known that I, WILLIAM M. SACK, of Oakland, county of Alameda, and State of California, have invented an Improved Water-Closet Valve; and I hereby declare the following to be a full, clear, and exact description thereof.

My invention relates to certain improvements in that class of valves which are applied to water-closets for regulating the flow of water washing out the bowls; and my improvements consist in connecting with the supply and discharge pipe two oppositely-placed pipes opening into opposite sides of a globe or water-chamber carrying an elastic diaphragm, a four-way valve being placed at the junction of the four pipes, said valve being operated by a lever connected with the closet-seat. On the depression of the lever by the weight on the seat the valve allows a certain amount of water to pass through one of the pipes into one side of the water-chamber, the pressure of this water expelling that already in said chamber and discharging it into the bowl. When the occupant rises the operation is repeated through the opposite pipe, the bowl being washed twice each time it is used.

In the accompanying drawings, Figure 1 is a view of my device with the water-chamber in section. Fig. 2 shows the perforations in the ends of the pipes $c\ c'$ where they connect with the chamber.

Let A represent the supply-pipe, which opens into a valve-chamber provided with a four-way valve, $a$, this valve being operated by rods $b$ connected with the lever B, as shown, a spring-weight or elastic band, $b'$, being used to throw the lever up and close the valve.

From the valve-chamber pass two pipes, C C', one in each direction, which enter the opposite sides of the water-chamber D. Connected with the lower part of the valve-chamber is a discharge-pipe, E, which empties into the bowl in the usual manner. In the center of the water-chamber D is a flexible diaphragm, $d$, for the purpose hereinafter described.

The lever B is connected with the seat of the water-closet, so that when said seat is depressed by the weight of an occupant said lever is pushed down and turns the four-way valve. The valve, when operated in this manner, allows the water to flow from the supply-pipe A through the pipe C into the water-chamber D. The same operation of the valve establishes a connection between the pipe C' and discharge-pipe E. The pressure of the water entering the water-chamber D through the pipe C is exerted on the flexible diaphragm $d$, which, in moving over, forces the water on the opposite side of said diaphragm out of the pipes C', through the valve $a$, and into the basin or bowl through the pipe E. This bowl is therefore thoroughly washed and moistened, so that no refuse will stick to it. On the occupant rising from the seat the valve $a$ is again turned by the lever, as described, the spring drawing said lever up, and the water flows into the water-chamber D through the pipe C'. This water, through the medium of the diaphragm, forces the water out of said chamber through the pipes C E into the bowl. The bowl is washed when the occupant of the closet sits down and when he rises.

The water-chamber with its diaphragm serves as a measure for the water, and can be made of suitable size for the quantity required for the bowl. Only the quantity entering said chamber passes at one time into the bowl. The ends of the pipes C C' entering said chamber are perforated, so as not to injure the elastic rubber diaphragm by allowing a large stream to strike in its center. Should there be any leakage in the valve, the water will pass into the bowl, and as the water-chamber is tight and immovable there is no danger of leakage from that source.

The lever operating the valve may be connected with a hand-lever instead of the seat, if preferred. No tank is required with this, the supply-pipe A being connected directly with the mains, the direct force of the water in said mains being utilized. A register can be attached to this device and the amount of water used can be registered.

Having thus described my invention, what I claim as new, and desire to secure by Letters Patent, is—

The improvement in water-closet valves consisting in the combination, with the supply-pipe A and discharge-pipe E, with its four-way valve $a$ and lever B, of the chamber feeding and discharging pipes C C', water-chamber D, and flexible diaphragm $d$, whereby a double washing of the bowl is secured and an equal quantity of water used at each operation, substantially as herein described.

In witness whereof I have hereunto set my hand.

WILLIAM M. SACK.

Witnesses:
CHAS. G. YALE,
S. H. NOURSE.